(12) United States Patent
Senoo

(10) Patent No.: US 11,251,664 B2
(45) Date of Patent: Feb. 15, 2022

(54) STATOR AND ELECTRIC MOTOR

(71) Applicant: FANUC CORPORATION, Minamitsuru-gun (JP)

(72) Inventor: Tatsuya Senoo, Yamanashi-ken (JP)

(73) Assignee: FANUC CORPORATION, Yamanashi-Ken (JP)

( * ) Notice: Subject to any disclaimer, the term of this patent is extended or adjusted under 35 U.S.C. 154(b) by 161 days.

(21) Appl. No.: 16/817,099

(22) Filed: Mar. 12, 2020

(65) Prior Publication Data
US 2020/0303975 A1    Sep. 24, 2020

(30) Foreign Application Priority Data

Mar. 19, 2019    (JP) .............................. JP2019-051388

(51) Int. Cl.
| H02K 1/16 | (2006.01) |
| H02K 3/52 | (2006.01) |
| H02K 3/12 | (2006.01) |
| H02K 1/14 | (2006.01) |
| H02K 3/28 | (2006.01) |

(52) U.S. Cl.
CPC .............. *H02K 1/165* (2013.01); *H02K 1/146* (2013.01); *H02K 3/12* (2013.01); *H02K 3/28* (2013.01); *H02K 3/522* (2013.01)

(58) Field of Classification Search
CPC .......... H02K 3/28; H02K 3/522; H02K 1/165; H02K 1/146; H02K 3/12
See application file for complete search history.

(56) References Cited

U.S. PATENT DOCUMENTS

| 3,780,324 | A | * | 12/1973 | Greenwell | H02K 3/28 310/180 |
| 5,652,470 | A | * | 7/1997 | von der Heide | H02K 21/22 310/156.05 |
| 6,133,663 | A | * | 10/2000 | Hoemann | H02K 1/146 310/156.56 |
| 6,998,750 | B2 | * | 2/2006 | Anma | H02K 3/28 310/179 |
| 7,148,593 | B2 | * | 12/2006 | Yoneda | H02K 3/522 310/71 |
| 7,602,137 | B2 | * | 10/2009 | Du | H02K 1/278 318/771 |
| 7,928,624 | B2 | * | 4/2011 | Huppunen | H02K 29/03 310/179 |
| 8,779,644 | B2 | * | 7/2014 | Tanaka | H02K 3/522 310/208 |
| 9,000,629 | B2 | * | 4/2015 | Yokogawa | H02K 15/12 310/43 |
| 9,118,231 | B2 | * | 8/2015 | Matsubara | H02K 3/28 |
| 9,748,810 | B2 | * | 8/2017 | Okinaga | H02K 3/345 |
| 9,768,649 | B2 | * | 9/2017 | Karwath | H02K 29/00 |

(Continued)

FOREIGN PATENT DOCUMENTS

JP       2016-039642 A       3/2016

*Primary Examiner* — Robert W Horn
(74) *Attorney, Agent, or Firm* — McGinn IP Law Group, PLLC

(57) ABSTRACT

A stator includes: a first wiring section connecting a coil wire end of a leading coil to a power line; and a second wiring section connecting a coil wire end of a last coil to a neutral point located on the power line side, by wiring that extends along a fewer-turns portion of the leading coil that has a smaller number of turns of wire than the last coil.

10 Claims, 4 Drawing Sheets

(56) References Cited

U.S. PATENT DOCUMENTS

| | | | |
|---|---|---|---|
| 10,491,057 B2* | 11/2019 | Seki | H02K 3/522 |
| 10,615,656 B2* | 4/2020 | Haga | H02K 3/28 |
| 11,114,912 B2* | 9/2021 | Fujieda | H02K 1/16 |
| 2012/0286593 A1* | 11/2012 | Yokogawa | H02K 3/522 310/43 |
| 2017/0126086 A1* | 5/2017 | Nagai | H02K 3/34 |
| 2019/0131840 A1* | 5/2019 | Tago | H02K 1/146 |
| 2020/0303975 A1* | 9/2020 | Senoo | H02K 1/146 |

* cited by examiner

STATOR AND ELECTRIC MOTOR

CROSS-REFERENCE TO RELATED APPLICATION

This application is based upon and claims the benefit of priority from Japanese Patent Application No. 2019-051388 filed on Mar. 19, 2019, the contents of which are incorporated herein by reference.

BACKGROUND OF THE INVENTION

Field of the Invention

The present invention relates to a stator and an electric motor.

Description of the Related Art

There are three-phase motors known as electric motors. The three-phase motor includes U-phase, V-phase and W-phase coils provided on a stator core, and power lines for supplying current to the coils.

Japanese Laid-Open Patent Publication No. 2016-039642 discloses a rotating electric machine in which the neutral point lead wire and the power-supply lead wire of each of three-phase coils wound on the teeth are extracted on one end side of the stator core in the axial direction and the extracted wires are connected to a neutral point connection part and a three-phase power supply part located on the same end side.

SUMMARY OF THE INVENTION

However, in the above rotating electric machine, since the coils of each phase must be connected on one axial end side of the stator core, the occupied volume of wiring-related components on the axial end side tends to increase.

To deal with this, it is conceivable that the power supply lead wires and the three-phase power supply parts are arranged on one axial end side of the stator core while the neutral point lead wires and the neutral point connection parts are arranged on the other axial end side. This arrangement makes it to reduce the occupied volume of the wiring-related components on one axial end side.

However, the power supply lead wire of each of the three-phase coils connected to the three-phase power supply part is arranged on one axial end side of the stator core, and the neutral-point lead wire of each of the three-phase coils is arranged on the other axial end side. For this reason, the number of turns of wire is partially reduced in each power supply lead wire of the three-phase coils connected to the three-phase power supply parts, as compared with the three-phase coils not connected to the three-phase power supply parts. As a result, torque ripple and unbalanced magnetic attraction are liable to occur, which tends to degrade the characteristics of the electric motor.

It is therefore an object of the present invention to provide a stator and an electric motor that can suppress characteristic deterioration of the motor.

According to a first aspect of the invention, a stator includes an annular core body having a plurality of teeth protruding from the inner peripheral surface of the core body toward the center axis of the core body, and a plurality of coils arranged on the respective teeth in correspondence with different phases, wherein: coil wire ends of the multiple coils for each of the phases are connected to one another, on an opposite side of the teeth from a power line configured to supply a phase current to the coils for each of the phases, so that the multiple coils for each of the phases are connected in series; and of the series-connected multiple coils for each of the phases, a coil wire end of the leading coil is located on the power line side, and a coil wire end of the last coil is located on the opposite side, and the stator includes: a first wiring section configured to connect the coil wire end of the leading coil to the power line; and a second wiring section configured to connect the coil wire end of the last coil to a neutral point located on the power line side, by wiring that extends along a portion of the leading coil that has a smaller number of turns of wire than the last coil.

A second aspect of the present invention is an electric motor including the above stator and a rotor.

According to the present invention, the second wiring section is arranged so as to extend along the portion of the leading coil having a smaller number of turns of wire than the last coil. Accordingly, torque ripple and unbalanced magnetic attraction are made unlikely to occur so that deterioration of the characteristics of the electric motor can be reduced. Deterioration can be suppressed.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The present invention will be detailed below by describing a preferred embodiment with reference to the accompanying drawings.

EMBODIMENT

Figure 1:
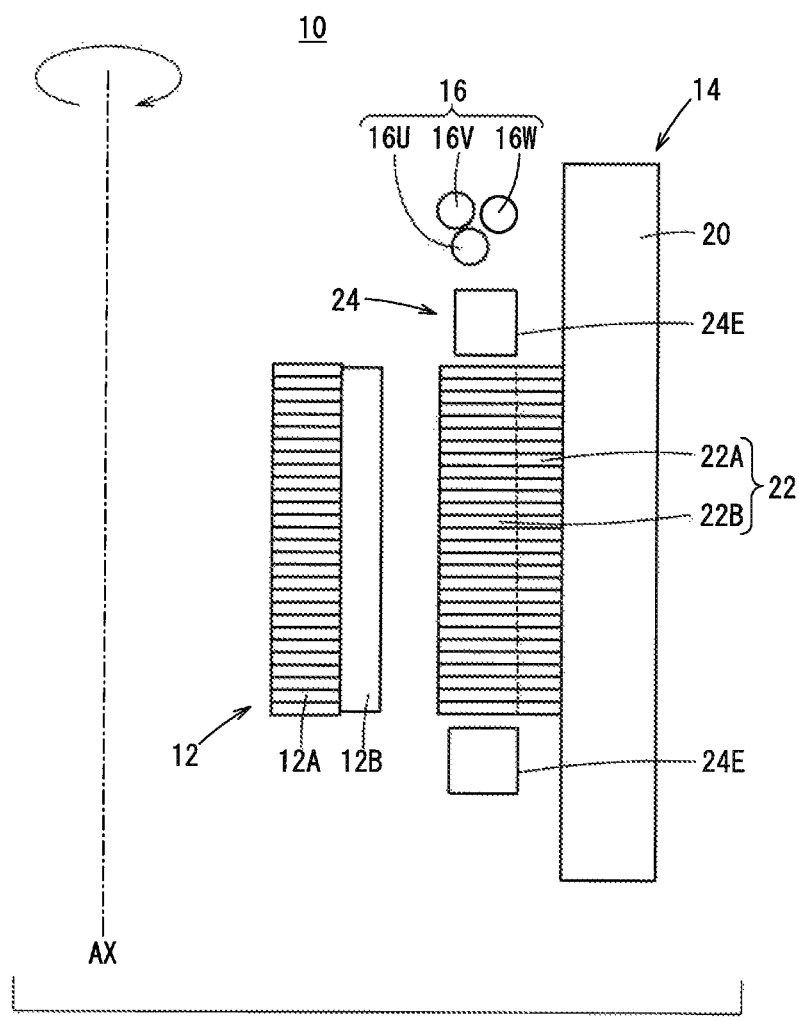
FIG. 1 is a sectional view schematically showing part of an electric motor.

FIG. 1 is a schematic sectional view showing part of an electric motor 10. The electric motor 10 is, for example, an inner rotor type electric motor, and includes a rotor 12 having a rotor core 12A and magnets 12B, a stator 14 arranged outside the rotor 12, power lines 16 for supplying current to the stator 14, and an unillustrated neutral point.

The stator 14 includes a housing 20, a stator core 22, and coils 24. The housing 20 is a resin member for accommodating the stator core 22, the coils 24 and others, and is formed in a substantially cylindrical shape.

The stator core 22 is a member made of an iron-based metal disposed around a rotary axis AX of the electric motor 10, and is fixed to the housing 20. The stator core 22 has a core body 22A and a plurality of teeth 22B.

The core body 22A is formed in an annular shape, and the axis (center axis) of the annular-shaped core body 22A coincides with the rotary axis AX of the electric motor 10.

The core body 22A may be formed in an annular shape by joining a plurality of divided core segments in a circumferential direction. The multiple teeth 22B are provided at intervals in the circumferential direction of the core body 22A. The multiple teeth 22B are each formed to protrude from the inner peripheral surface of the core body 22A toward the axis (center axis) of the core body 22A.

There are a plurality of coils 24 corresponding to different phases. The number of phases for coils 24 is generally three, namely, U phase, V phase, and W phase, but the number of phases for coils 24 need not necessarily be limited to three. A group of multiple coils 24 corresponding to each of the multiple phases are provided on multiple teeth 22B. Specifically, one coil 24 is wound around each of multiple teeth 22B in a concentrated winding manner. Note that, in the present embodiment, the number of phases for coils 24 is three, U phase, V phase and W phase.

In the coils 24 wound on the multiple teeth 22B, the power line 16 is arranged near one of the two coil ends 24E protruding from the axial ends of the stator core 22. The power line 16 allows a phase current to flow through the multiple coils 24 corresponding to each phase. In the present embodiment, the power line includes a U-phase power line 16U for supplying U-phase current, a V-phase power line 16V for supplying V-phase current and a W-phase power line 16W for supplying W-phase current.

Figure 2:
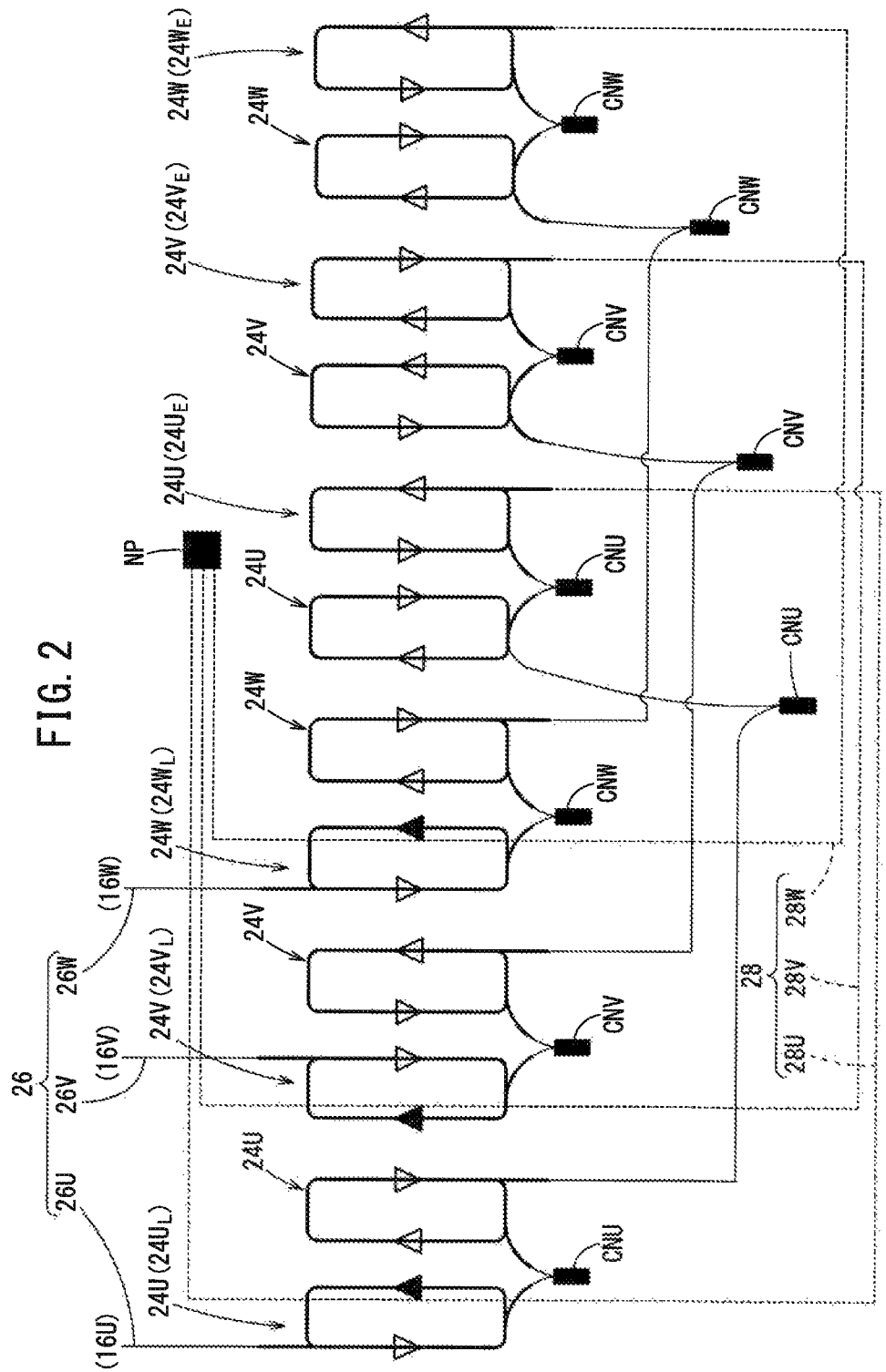
FIG. 2 is a schematic diagram showing a connection state of multiple coils.

FIG. 2 is a schematic diagram showing a connection state of multiple coils 24. "Δ (white triangle)" in FIG. 2 indicates the winding direction of the coil 24. "▲ (black triangle)" in FIG. 2 will be explained later.

The multiple coils 24 are connected in series for each phase. That is, in a group of the coils 24U for U phase, the coil wire ends of the multiple coils 24U are connected to one another, whereby the multiple coils 24U for U phase are connected in series. Similarly, in a group of the coils 24V for V phase, the coil wire ends of the multiple coils 24V are connected to one another, whereby the multiple coils 24V for V phase are connected in series. Further, in a group of the coils 24W for W phase, the coil wire ends of the multiple coils 24W are connected to one another, whereby the multiple coils 24W for W phase are connected in series.

All of joints CNU between coils 24U for U phase, joints CNV between coils 24V for V phase, and joints CNW between coils 24W for W phase are located on the opposite side of the teeth 22B (FIG. 1) from the power lines 16. In this configuration, the occupied volume of the wiring-related components on the power lines 16 side can be reduced as compared to the case where these joints CNU, CNV, CNW are arranged on the power line 16 side.

Here, in each series of the series-connected coils 24U, 24V, 24W corresponding to the respective phases, a coil 24U, 24V, 24W that is located at one end is referred to as a leading coil $24U_L$, $24V_L$, $24W_L$. Additionally, in each series of the series-connected coils 24U, 24V, 24W corresponding to the respective phases, a coil 24U, 24V, 24W that is located at the other end is referred to as a last coil (i.e., a very end coil) $24U_E$, $24V_E$, $24W_E$.

The front coil wire end of each of the leading coils $24U_L$, $24V_L$ and $24W_L$ is located on the power line 16 side of the teeth 22B (FIG. 1). The front coil wire end is one of the two opposite coil wire ends of each of the leading coils $24U_L$, $24V_L$, $24W_L$ that is not connected to the coil wire end of the second coil 24U, 24V, 24W.

The front coil wire end and the power line 16 are connected to each other for each phase. That is, the stator 14 of the present embodiment has a first wiring section 26 configured to connect the front coil wire ends located on the power line 16 side, to the power lines 16.

In the present embodiment, the first wiring section 26 includes: a U-phase wiring 26U for connecting the U-phase front coil wire end to a U-phase power line 16U; a V-phase wiring 26V for connecting the V-phase front coil wire end to a V-phase power line 16V; and a W-phase wiring 26W for connecting the W-phase front coil wire end to a W-phase power line 16W.

On the other hand, the rear coil wire end of each of the last coils $24U_E$, $24V_E$ and $24W_E$ is located on the opposite side of the teeth 22B (FIG. 1) from the power line 16. The rear coil wire end is one of the two opposite coil wire ends of each of the last coils $24U_E$, $24V_E$, $24W_E$ that is not connected to the coil wire end of the second-to-last coil 24U, 24V, 24W.

Figure 3:
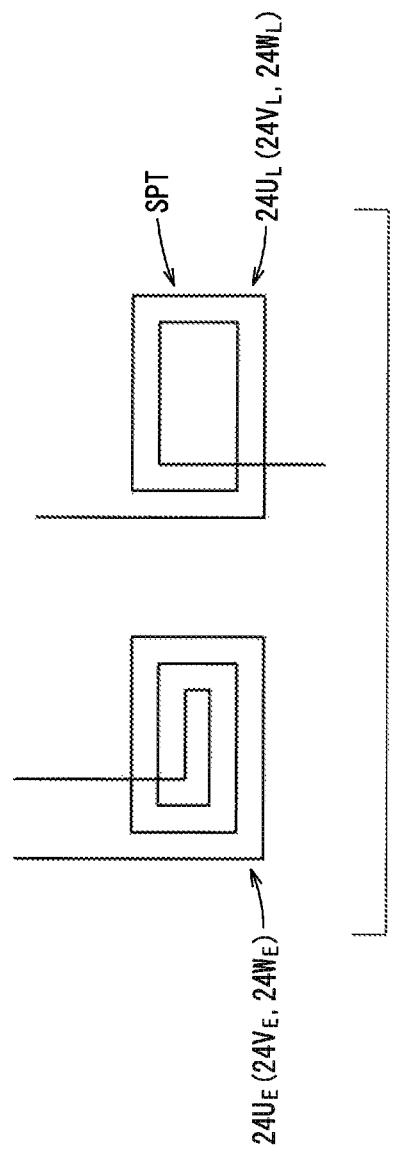
FIG. 3 is a diagram conceptually showing a difference in the number of turns of wire between the leading coil and the last coil.

FIG. 3 is a diagram conceptually showing the difference in the number of turns of wire between the leading coil $24U_L$ and the last coil $24U_E$. For convenience, FIG. 3 shows only the leading coil $24U_L$ and the last coil $24U_E$ in U phase. However, the leading coil $24V_L$ and the last coil $24V_E$ in V phase and the leading coil $24W_L$ and the last coil $24W_E$ in W phase are the same as the leading coil $24U_L$ and the last coil $24U_E$ in U phase.

That is, in the last coils $24U_E$, $24V_E$, and $24W_E$, both the coil wire ends of each coil extend to the opposite side of the teeth from the power line 16, so that the two opposite coil wire ends extend in the same direction. Thus, the last coils $24U_E$, $24V_E$ and $24W_E$ each have the same number of turns of wire along the whole circumference.

On the other hand, in the leading coils $24U_L$, $24V_L$, $24W_L$, one (the front coil wire end) of the both coil wire ends extends to the power line 16 side, and the other coil wire end (the rear coil wire end) extends to the other side than the power line 16 side. That is, the two coil wire ends extend opposite to each other. For this reason, in the leading coils $24U_L$, $24V_L$, $24W_L$, a fewer-turns portion SPT appears.

The fewer-turns portion SPT is a portion in the leading coil $24U_L$, $24V_L$ or $24W_L$ that has a smaller number of turns of wire than the last coil $24U_E$, $24V_E$ or $24W_E$, and is indicated by "▲ (black triangle)" in FIG. 2. In the fewer-turns portion SPT, torque ripple and unbalanced magnetic attraction are likely to occur, as mentioned above.

As such, in the present embodiment, as shown in FIG. 2, a neutral point NP is provided on the power line 16 side, and the neutral point NP and the rear coil wire end of each phase located on the side opposite to the power line 16 side are connected together by wiring that extends along the fewer-turns portion SPT.

That is, the stator 14 of the present embodiment has a second wiring section 28 that connects the rear coil wire end to the neutral point NP by wiring that extends along the fewer-turns portion SPT. In this second wiring section 28, at least a portion thereof that passes by and extends along the fewer-turns portion SPT may be covered with an insulating tube.

In the present embodiment, the second wiring section 28 includes a U-phase wiring 28U for connecting the rear coil wire end of the U-phase to the neutral point NP, a V-phase wiring 28V for connecting the rear coil wire end of the V-phase to the neutral point NP, and a W-phase wiring 28W for connecting the rear coil wire end of the W-phase to the neutral point NP. Here, the neutral point NP is a connection point to which each of the U phase, V phase and W phase wirings is connected.

As described above, since the stator 14 of the present embodiment is configured so that the neutral point NP located on the power line 16 side is connected to the rear coil wire ends located on the side opposite to the power line 16 side by wiring that extends along the fewer-turns portion SPT, it is possible to make torque ripple and unbalanced magnetic attraction unlikely to occur. Therefore, in the present embodiment, it is possible to suppress deterioration of the characteristics of the electric motor 10.

Figure 4:
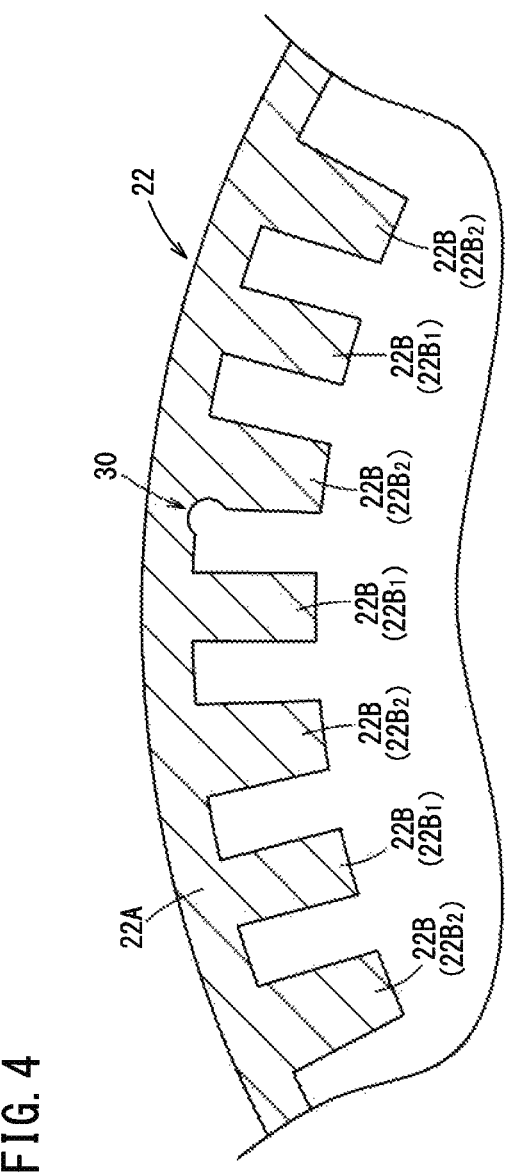
FIG. 4 is a schematic diagram showing a part of a stator core.

FIG. 4 is a schematic view showing part of the stator core 22. FIG. 4 shows a case where the stator core 22 is viewed from one of the coil ends 24E (FIG. 1). However, in FIG. 4, the coils 24, the power lines 16 and the like are omitted, so that only a part of the stator core 22 is illustrated.

In the present embodiment, the multiple teeth 22B are composed of first teeth $22B_1$ and second teeth $22B_2$. The first teeth $22B_1$ and the second teeth $22B_2$ are disposed alternately along the circumferential direction of the core body 22A.

The first tooth $22B_1$ has a rectangular cross section in a plane orthogonal to the axis (center axis) of the core body 22A. The second tooth $22B_2$ has a trapezoidal cross section in a plane orthogonal to the axis (center axis) of the core body 22A, and has a greater sectional area than the first tooth $22B_1$.

A passage 30 for allowing the second wiring section 28 (FIG. 2) to pass therethrough is formed at the boundary between the core body 22A and one second tooth $22B_2$. Specifically, the passage 30 is formed in a boundary portion between the core body 22A and each of the second teeth $22B_2$ around which the leading coil $24U_L$, $24V_L$, $24W_L$ (FIG. 2) corresponding to each of the multiple phases is wound. That is, the passage 30 is formed for each of multiple phases, and one of the U-phase wiring 28U, V-phase wiring 28V, and W-phase wiring 28W (FIG. 2) is passed through the passage 30. In FIG. 4, only one passage 30 is shown for convenience.

As described above, formation of the passage 30 through which the second wiring section 28 is passed, in the stator core 22 makes it easy to arrange the second wiring section 28 along the fewer-turns portion SPT. Further, since the passage 30 is formed in the boundary between the second tooth $22B_2$, which is larger than the first tooth $22B_1$, and the core body 22A, it is possible to prevent degradation of the strength of the stator core 22 and also prevent decrease in torque due to magnetic saturation when a large current flows, as compared to a case where the passage 30 is formed at the boundary between the first tooth $22B_1$ and the core body 22A.

In the present embodiment, the passage 30 is formed as a depressed portion on the surface at the boundary between the core body 22A and the second tooth $22B_2$. With this configuration, the second wiring section 28 can be brought closer to the fewer-turns portion SPT so that torque ripple and unbalanced magnetic attraction are made further unlikely to occur.

[Modifications]

Though the above embodiment has been described as one example of the present invention, the technical scope of the invention should not be limited to the above embodiment. It goes without saying that various modifications and improvements can be added to the above embodiment. It is also apparent from the scope of claims that the embodiment added with such modifications and improvements should be incorporated in the technical scope of the invention.

In the above embodiment, the multiple teeth 22B include first teeth $22B_1$ and second teeth $22B_2$, but may be formed with only the first teeth $22B_1$ or the second teeth $22B_2$.

In the above embodiment, the passage 30 is formed at the boundary between the core body 22A and one tooth 22B (second tooth $22B_2$), but may be formed only in the core body 22A or only in the tooth 22B.

In the above embodiment, the passage 30 is a depressed portion formed in the surface of the stator core 22, but may be formed as a through hole.

The above embodiments and Modifications may be arbitrarily combined as long as no technical inconsistency occurs.

THE PRESENT INVENTION

Inventions that can be grasped from the above-described embodiment and Modifications will be described below.
(First Invention)

The first invention is a stator (14) including an annular core body (22A) having a plurality of teeth (22B) protruding from the inner peripheral surface of the core body toward the center axis of the core body, and a plurality of coils (24U, 24V, 24W) arranged on the respective teeth (22B) in correspondence with different phases. Coil wire ends of the multiple coils (24U, 24V, 24W) for each of the phases are connected to one another, on an opposite side of the teeth (22B) from a power line (16) configured to supply a phase current to the coils (24U, 24V, 24W) for each of the phases, so that the multiple coils (24U, 24V, 24W) for each of the phases are connected in series.

Of the series-connected multiple coils (24U, 24V, 24W) for each of the phases, a coil wire end of the leading coil ($24U_L$, $24V_L$, $24W_L$) is located on the power line (16) side, and a coil wire end of the last coil ($24U_E$, $24V_E$, $24W_E$) is located on the opposite side.

The stator (14) includes: a first wiring section (26) configured to connect the coil wire end of the leading coil ($24U_L$, $24V_L$, $24W_L$) to the power line (16); and a second wiring section (28) configured to connect the coil wire end of the last coil ($24U_E$, $24V_E$, $24W_E$) to a neutral point (NP) located on the power line (16) side, by wiring that extends along a portion (fewer-turns portion SPT) of the leading coil ($24U_L$, $24V_L$, $24W_L$) that has a smaller number of turns of wire than the last coil ($24U_E$, $24V_E$, $24W_E$).

In this stator (14), since the second wiring section (28) is passed so as to extend along the portion (fewer-turns portion SPT) of the leading coil ($24U_L$, $24V_L$, $24W_L$) that has a smaller number of turns of wire than the last coil ($24U_E$, $24V_E$, $24W_E$), this arrangement makes it possible to make torque ripple and unbalanced magnetic attraction unlikely to occur, and hence suppress deterioration of the characteristics of the electric motor (10).

A passage (30) configured to allow the second wiring section (28) to pass therethrough may be formed in at least one of the core body (22A) and one of the teeth (22B). This makes it easier to arrange the second wiring section (28) along the portion having a smaller number of turns of wire (fewer-turns portion SPT).

The passage (30) may be a depressed portion formed in the surface of a boundary portion between the core body (22A) and one of the teeth (22B). With this configuration, the second wiring section (28) can be brought closer to a portion having a small number of turns of wire (fewer-turns portion SPT) so that torque ripple and unbalanced magnetic attraction are further unlikely to occur.

The plurality of teeth (22B) may include first teeth ($22B_1$) and second teeth ($22B_2$), a cross section of each of the second teeth in a plane perpendicular to the center axis of the core body (22A) being greater than that of each of the first teeth ($22B_1$), and a passage (30) may be formed in at least one of the second teeth ($22B_2$). As a result, it is possible to prevent degradation of the strength of the stator core (22) and also prevent decrease in torque due to magnetic saturation when a large current flows, as compared to a case where the passage (30) is formed in the first tooth ($22B_1$).

(Second Invention)

The second invention is an electric motor (10) including the above stator (14) and a rotor (12). In this electric motor (10), since the above stator (14) is provided, deterioration of the characteristics of the electric motor (10) can be reduced.

The present invention is not particularly limited to the embodiments described above, and various modifications are possible without departing from the essence and gist of the present invention.

What is claimed is:

1. A stator including an annular core body having a plurality of teeth protruding from an inner peripheral surface of the core body toward a center axis of the core body, and a plurality of coils arranged on the respective teeth in correspondence with different phases, wherein:
    coil wire ends of the multiple coils for each of the phases are connected to one another, on an opposite side of the teeth from a power line configured to supply a phase current to the coils for each of the phases, so that the multiple coils for each of the phases are connected in series; and
    of the series-connected multiple coils for each of the phases, a coil wire end of a leading coil is located on a power line side, and a coil wire end of a last coil is located on the opposite side,
    the stator comprising:
    a first wiring section configured to connect the coil wire end of the leading coil to the power line; and
    a second wiring section configured to connect the coil wire end of the last coil to a neutral point located on the power line side, by wiring that extends along a portion of the leading coil that has a smaller number of turns of wire than the last coil.

2. The stator according to claim 1, wherein a passage configured to allow the second wiring section to pass therethrough is formed in at least one of the core body and one of the teeth.

3. The stator according to claim 2, wherein the passage is a depressed portion formed in a surface of a boundary portion between the core body and one of the teeth.

4. The stator according to claim 1, wherein:
    the plurality of teeth include first teeth and second teeth,
    a cross section of each of the second teeth in a plane perpendicular to the center axis of the core body being greater than that of each of the first teeth; and
    a passage configured to allow the second wiring section to pass therethrough is formed in at least one of the second teeth.

5. The stator according to claim 4, wherein the passage is a depressed portion formed in a surface of a boundary portion between the core body and one of the second teeth.

6. An electric motor including a stator and a rotor, wherein:
    the stator includes an annular core body, a plurality of teeth protruding from an inner peripheral surface of the core body toward a center axis of the core body, and a plurality of coils arranged on the respective teeth in correspondence with different phases;
    coil wire ends of the multiple coils for each of the phases are connected to one another, on an opposite side of the teeth from a power line configured to supply a phase current to the coils for each of the phases, so that the multiple coils for each of the phases are connected in series; and
    of the series-connected multiple coils for each of the phases, a coil wire end of a leading coil is located on a power line side, and a coil wire end of a last coil is located on the opposite side;
    the coil wire end of the leading coil is connected to the power line by a first wiring section; and
    the coil wire end of the last coil is connected to a neutral point located on the power line side, by a second wiring section that extends along a portion of the leading coil that has a smaller number of turns of wire than the last coil.

7. The electric motor according to claim 6, wherein a passage configured to allow the second wiring section to pass therethrough is formed in at least one of the core body and one of the teeth.

8. The electric motor according to claim 7, wherein the passage is a depressed portion formed in a surface of a boundary portion between the core body and one of the teeth.

9. The electric motor according to claim 6, wherein:
    the plurality of teeth include first teeth and second teeth,
    a cross section of each of the second teeth in a plane perpendicular to the center axis of the core body being greater than that of each of the first teeth; and
    at least one of the second teeth includes, formed therein, a passage configured to allow the second wiring section to pass therethrough.

10. The electric motor according to claim 9, wherein the passage is a depressed portion formed in a surface of a boundary portion between the core body and one of the second teeth.

* * * * *